(12) United States Patent
Yuuki

(10) Patent No.: US 11,929,662 B2
(45) Date of Patent: Mar. 12, 2024

(54) POWER CIRCUIT AND CONTROL METHOD

(71) Applicant: SONY GROUP CORPORATION, Tokyo (JP)

(72) Inventor: Hitoshi Yuuki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 202 days.

(21) Appl. No.: 17/632,893

(22) PCT Filed: Jul. 7, 2020

(86) PCT No.: PCT/JP2020/026503
§ 371 (c)(1),
(2) Date: Feb. 4, 2022

(87) PCT Pub. No.: WO2021/029162
PCT Pub. Date: Feb. 18, 2021

(65) Prior Publication Data
US 2022/0271643 A1 Aug. 25, 2022

(30) Foreign Application Priority Data
Aug. 13, 2019 (JP) .................................. 2019-148633

(51) Int. Cl.
*H02M 1/00* (2006.01)
*H02M 1/14* (2006.01)
*H02M 3/335* (2006.01)

(52) U.S. Cl.
CPC ........... *H02M 1/0038* (2021.05); *H02M 1/14* (2013.01); *H02M 3/33571* (2021.05)

(58) Field of Classification Search
CPC .. H02M 1/0038; H02M 3/33571; H02M 1/14; H02M 1/00; H02M 3/335
See application file for complete search history.

(56) References Cited

U.S. PATENT DOCUMENTS
2006/0181252 A1 8/2006 Yoshida et al.

FOREIGN PATENT DOCUMENTS

| JP | H03-98465 | 4/1991 |
| JP | H09-163725 | 6/1997 |
| JP | 2005-224069 | 8/2005 |
| JP | 4366713 | 11/2009 |

OTHER PUBLICATIONS

International Search Report prepared by the Japan Patent Office dated Sep. 8, 2020, for International Application No. PCT/JP2020/026503, 2 pgs.

*Primary Examiner* — Robert L Deberadinis
(74) *Attorney, Agent, or Firm* — Sheridan Ross PC

(57) ABSTRACT

A power circuit is provided that includes at least a first power supply unit and a second power supply unit. The first power supply unit includes a first input section, a first AC voltage generator, a first rectification-and-smoothing section, and a first isolation section that is provided between the first AC voltage generator and the first rectification-and-smoothing section. The second power supply unit includes a second input section, a second AC voltage generator, a second rectification-and-smoothing section, and a second isolation section that is provided between the second AC voltage generator and the second rectification-and-smoothing section. The power circuit is configured such that the second AC voltage generator generates an AC voltage having a phase obtained by inverting a phase of the AC voltage generated by the first AC voltage generator.

10 Claims, 13 Drawing Sheets

A

Drive signals for each of power supply unit 1, power supply unit 3, ..., and power supply unit (2N-1)

B

Drive signals for each of power supply unit 2, power supply unit 4, ..., and power supply unit (2N)

POWER CIRCUIT AND CONTROL METHOD

CROSS REFERENCE TO RELATED APPLICATIONS

This application is a national stage application under 35 U.S.C. 371 and claims the benefit of PCT Application No. PCT/JP2020/026503, having an international filing date of 7 Jul. 2020, which designated the United States, which PCT application claimed the benefit of Japanese Patent Application No. 2019-148633, filed 13 Aug. 2019, the entire disclosures of each of which are incorporated herein by reference.

TECHNICAL FIELD

The present disclosure relates to a power circuit and a control method.

BACKGROUND ART

An isolation switching power supply used in a power supply or a charger generally uses an isolation transformer to transfer, through a magnetic flux generated by applying an AC voltage to a primary-side coil of the isolation transformer, a power to a secondary-side coil of the isolation transformer while maintaining isolation. When the frequency of an applied AC voltage is made higher and a capacitor or isolation transformer in use is made smaller in size, this results in obtaining a switching power supply smaller in size. Recently, a semiconductor device that uses gallium nitride (GaN) or silicon carbide (SiC) is available, where improvement can be achieved with the semiconductor device with respect to increasing switching losses in semiconductor that are negative effects provided due to the frequency being made higher. Thus, the frequency is expected to be further made higher.

In an isolation transformer, the cross-sectional area of a used ferrite core can be made smaller due to the frequency being made higher. This results in being able to make a core volume smaller. However, it is structurally difficult to make a coil smaller in volume since there is a need to cope with increased losses due to a skin effect or a proximity effect that is caused in the coil due to the frequency of current that flows through the coil being made higher. Thus, a great effect is not expected to be provided by a transformer being made smaller in size due to the frequency being made higher. In other words, a switching power supply using an isolation transformer can be made smaller in size by the switching frequency being made higher, but there are limitations on the downsizing due to the structure of the isolation transformer. In order to solve the problem described above, a technology has been proposed that provides insulation and transfers power using a capacitor instead of an insulation transformer that causes the limitations on downsizing (for example, refer to Patent Literature 1 indicated below).

CITATION LIST

Patent Literature

Patent Literature 1: Japanese Patent No. 4366713

DISCLOSURE OF INVENTION

Technical Problem

In a capacitor isolation switching power supply including a capacitor that replaces an isolation transformer to serve as the isolation transformer, a high-frequency voltage that is synchronized with a switching frequency is generated on the secondary side, as viewed from the primary side. Since the high-frequency voltage may have a bad effect on, for example, a circuit operation, it is desirable to remove as much high-frequency voltage as possible.

Thus, it is an object of the present disclosure to provide a power circuit and a control method that make it possible to remove as much high-frequency voltage as possible, the high-frequency voltage being generated on the secondary side, as viewed from the primary side, and being synchronized with a switching frequency.

Solution to Problem

For example, the present disclosure provides a power circuit that includes at least a first power supply unit and a second power supply unit, the first power supply unit including
 a first input section,
 a first AC voltage generator that generates a first AC voltage on the basis of an input voltage input to the first input section,
 a first rectification-and-smoothing section that rectifies and smooths the first AC voltage, and
 a first isolation section that includes a capacitor and is provided between the first AC voltage generator and the first rectification-and-smoothing section, the second power supply unit including
 a second input section,
 a second AC voltage generator that generates a second AC voltage on the basis of an input voltage input to the second input section,
 a second rectification-and-smoothing section that rectifies and smooths the second AC voltage, and
 a second isolation section that includes a capacitor and is provided between the second AC voltage generator and the second rectification-and-smoothing section, the power circuit being configured such that the second AC voltage generator generates the AC voltage of which a phase is obtained by inverting a phase of the AC voltage generated by the first AC voltage generator.

For example, the present disclosure provides a control method that is performed by a power circuit that includes at least a first power supply unit and a second power supply unit, the first power supply unit including a first input section, a first AC voltage generator that generates a first AC voltage on the basis of an input voltage input to the first input section, a first rectification-and-smoothing section that rectifies and smooths the first AC voltage, and a first isolation section that includes a capacitor and is provided between the first AC voltage generator and the first rectification-and-smoothing section, the second power supply unit including a second input section, a second AC voltage generator that generates a second AC voltage on the basis of an input voltage input to the second input section, a second rectification-and-smoothing section that rectifies and smooths the second AC voltage, and a second isolation section that includes a capacitor and is provided between the second AC voltage generator and the second rectification-and-smoothing section, the control method including performing, by a controller, control such that the second AC voltage generator generates the AC voltage of which a phase is obtained by inverting a phase of the AC voltage generated by the first AC voltage generator.

Figure 9:
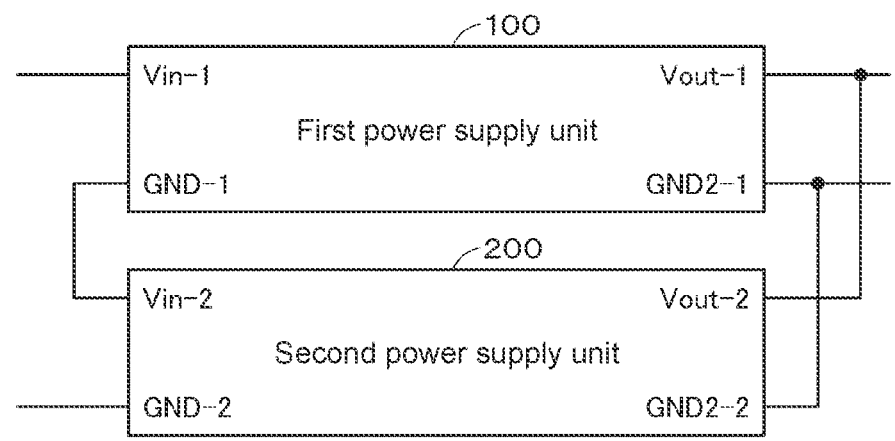
Figure 9:
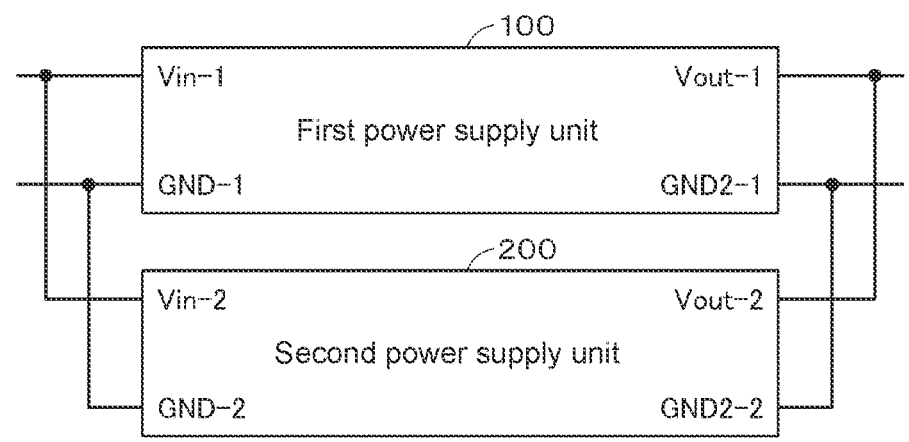

A and B of FIG. 9 are diagrams that are referred to when examples of a method for connecting the first and second power supply units according to the present embodiment are described.

Figure 10:
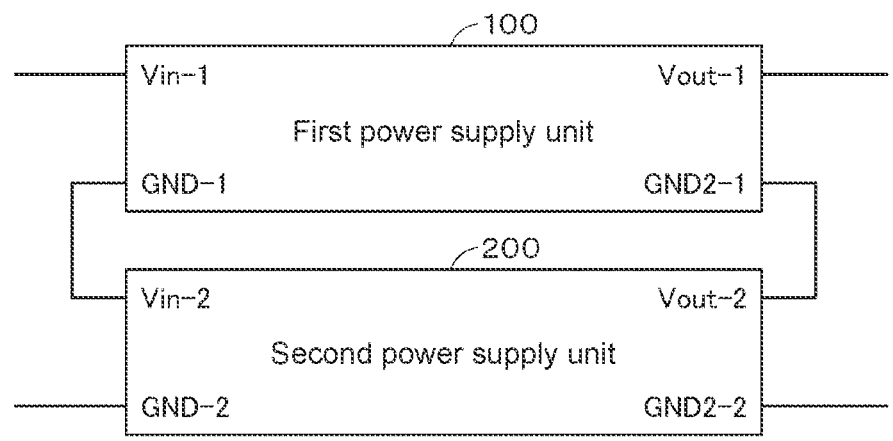
Figure 10:
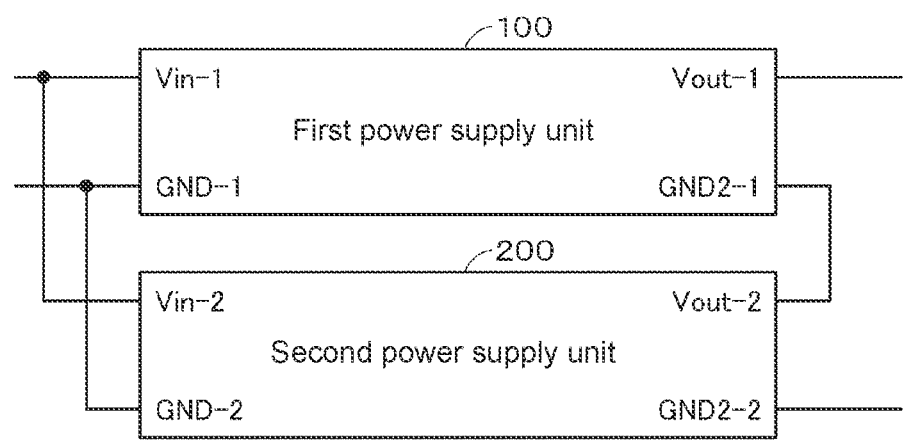

A and B of FIG. 10 are diagrams that are referred to when other examples of the method for connecting the first and second power supply units according to the present embodiment are described.

Figure 11:
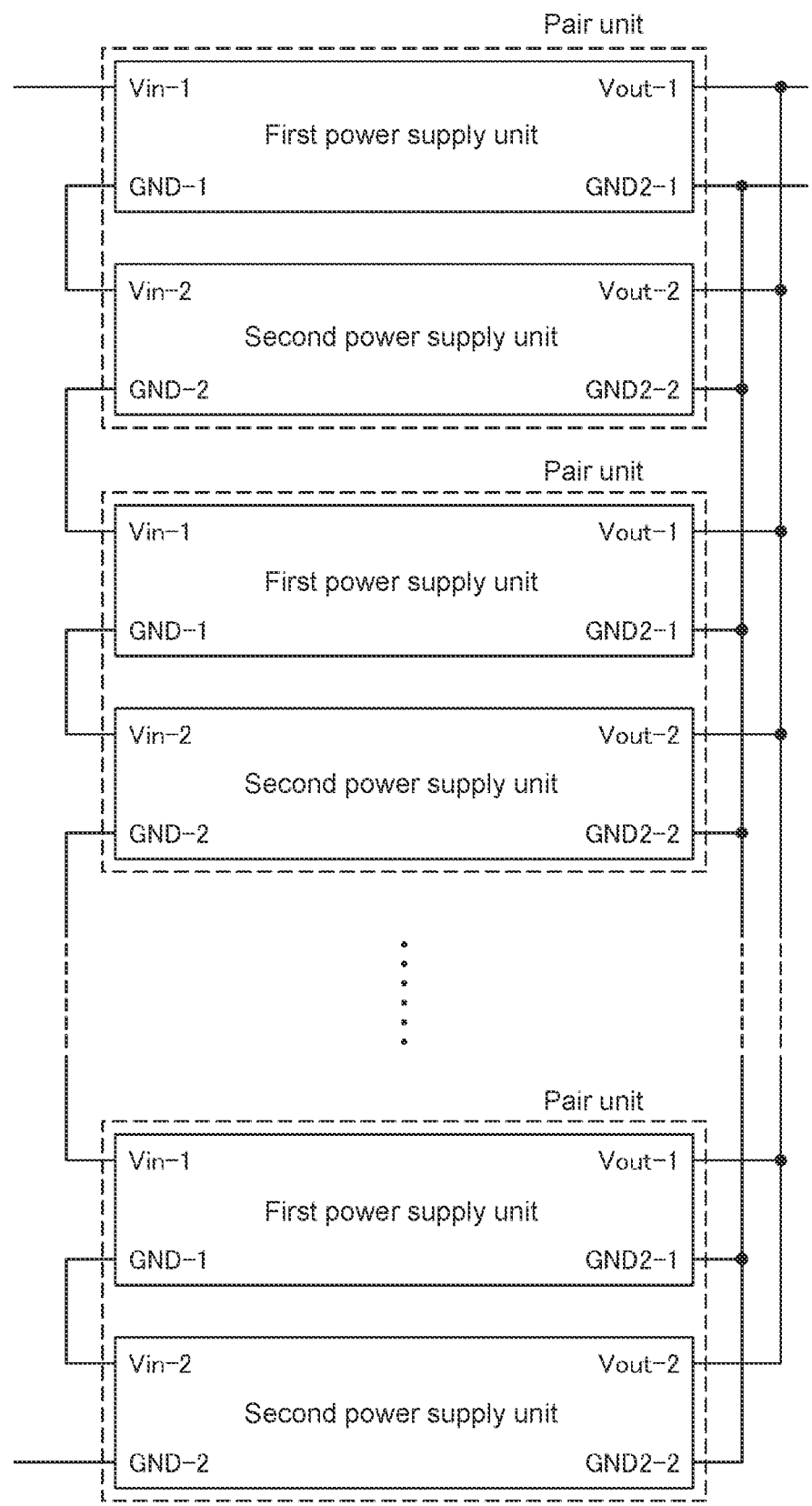

FIG. 11 is a diagram used to describe a modification.

Figure 12:
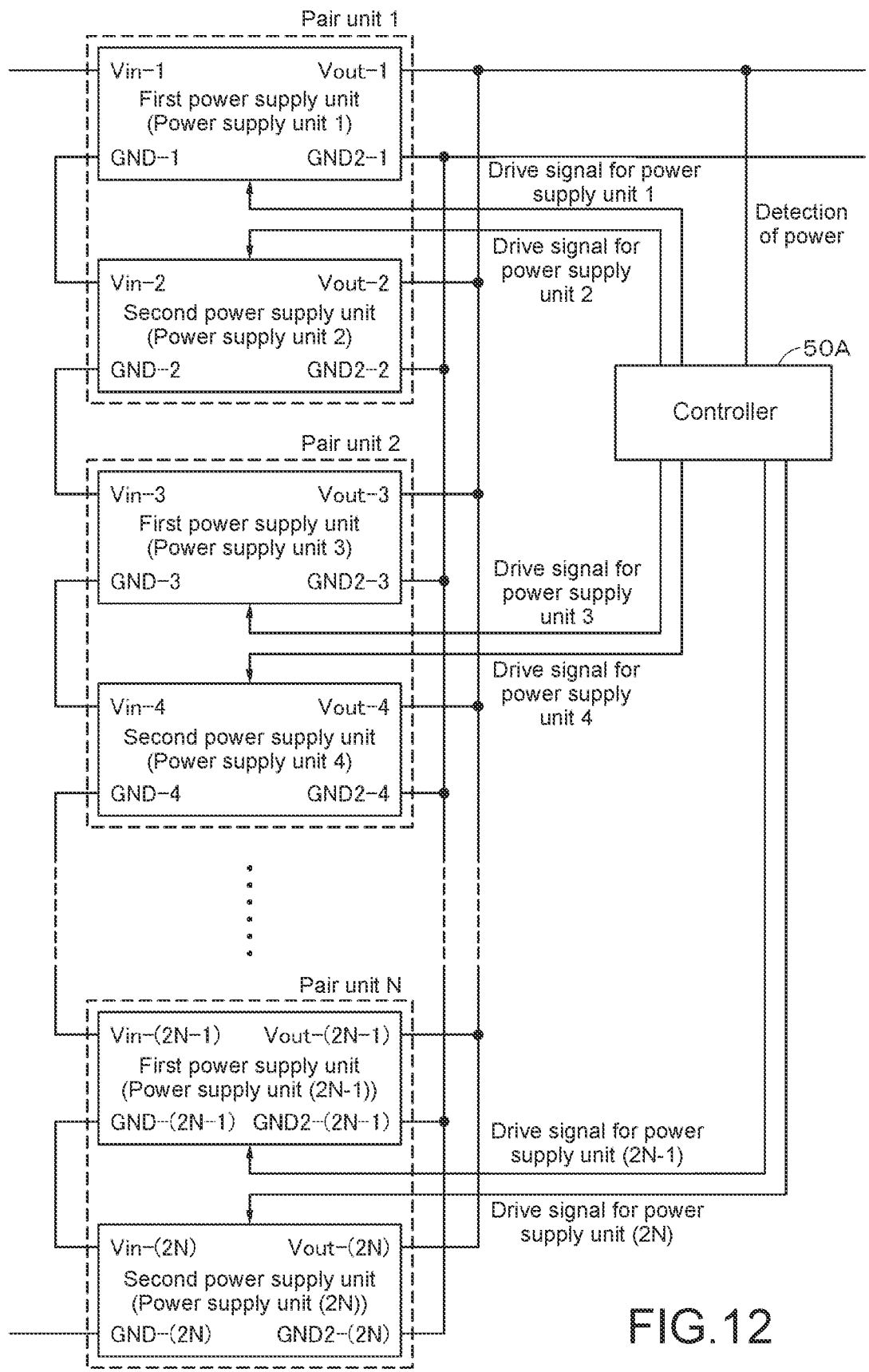

FIG. 12 is a diagram used to describe a modification.

Figure 13:
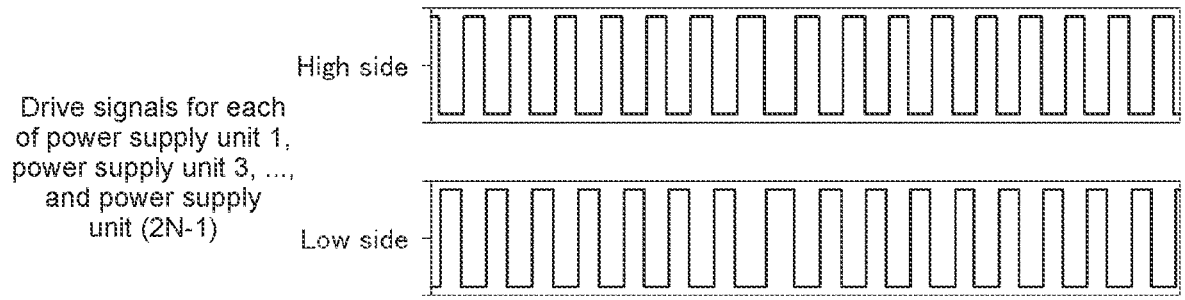
Figure 13:
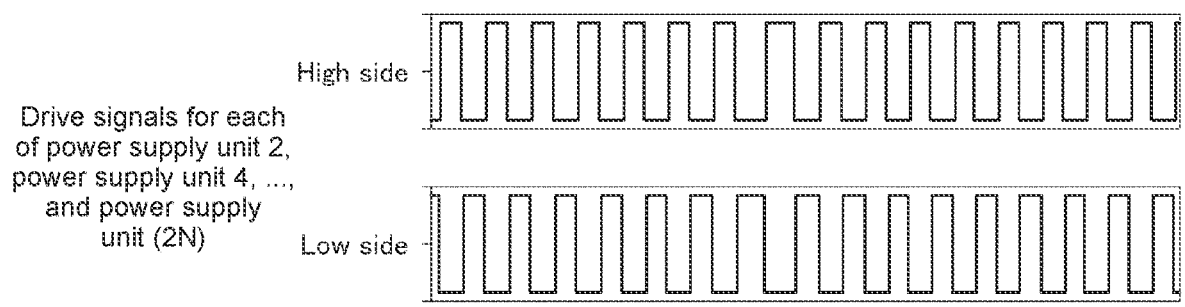

A and B of FIG. 13 are diagrams used to describe a modification.

Figure 14:
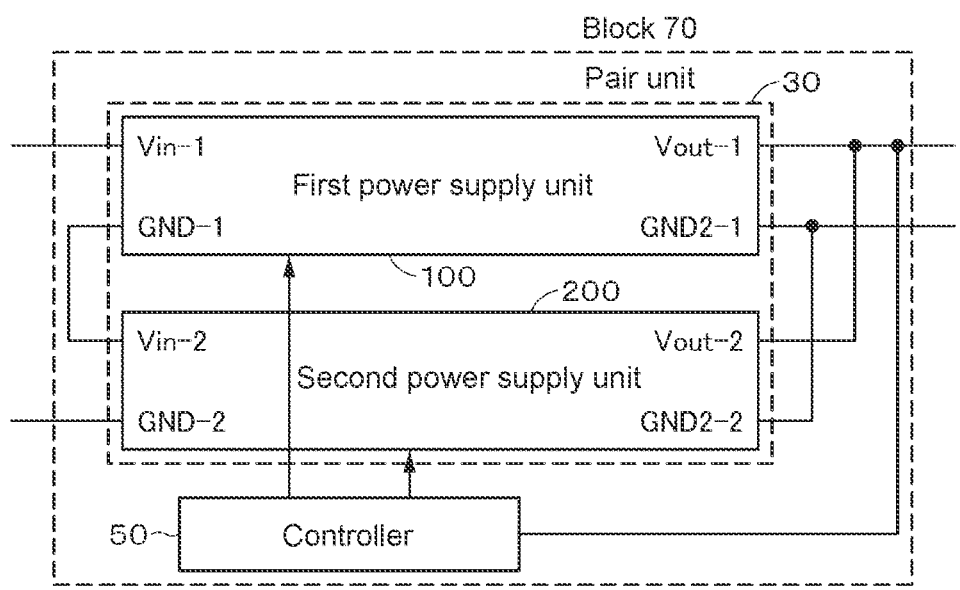

FIG. 14 is a diagram used to describe a modification.

Figure 15:
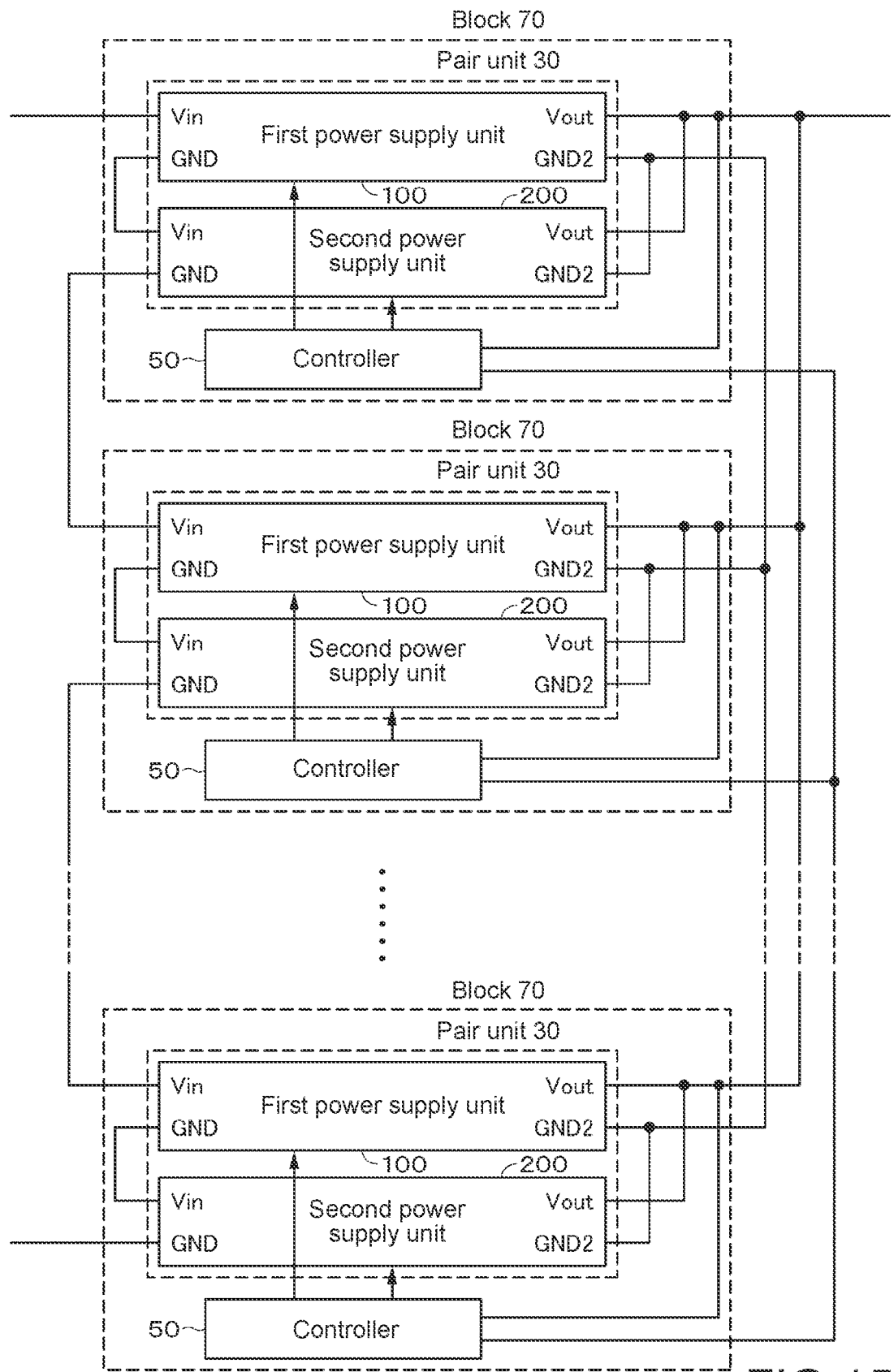

FIG. 15 is a diagram used to describe a modification.

MODE(S) FOR CARRYING OUT THE INVENTION

Embodiments and the like of the present disclosure will now be described below with reference to the drawings. Note that the description is made in the following order.
<Issues to be Considered Regarding Embodiments>
<Embodiments>
<Modifications>

The embodiments and the like described below are favorable specific examples of the present disclosure, and contents of the present disclosure are not limited to these embodiments and the like.

<Issues to be Considered Regarding Embodiments>

Figure 1:
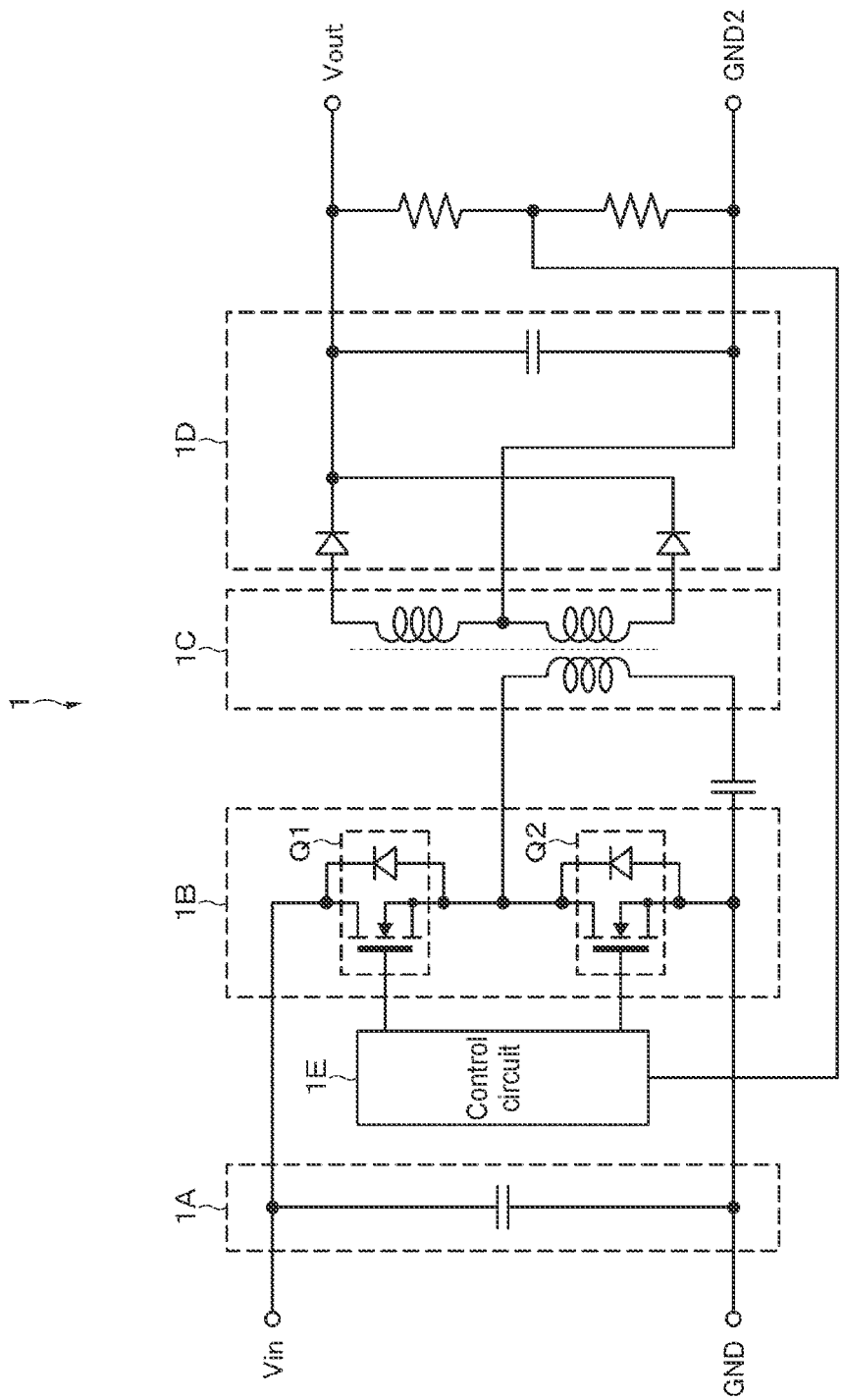
FIG. 1 illustrates an example of a circuit configuration of a general power circuit.

In order to facilitate the understanding of the present disclosure, a general technology is described first. FIG. 1 illustrates an example of a circuit configuration of a power circuit that includes a general LLC resonant circuit. A power circuit 1 illustrated in FIG. 1 includes an input section 1A, an AC voltage generator 1B, an isolation section 1C, a rectification-and-smoothing section 1D, and a control circuit 1E. The AC voltage generator 1B includes a switching element Q1 and a switching element Q2 that each include a metal-oxide-semiconductor field-effect transistor (MOSFET), and are connected in series. The switching elements Q1 and Q2 are controlled by the control circuit 1E to perform on-off switching. Specifically, the switching elements Q1 and Q2 are controlled by the control circuit 1E such that the switching elements Q1 and Q2 are complementary to each other, that is, such that one of the switching elements Q1 and Q2 is turned off when another of the switching elements Q1 and Q2 is turned on.

The isolation section 1C includes a transformer. An AC voltage generated by the AC voltage generator 1B is transferred to the rectification-and-smoothing section 1D through the isolation section 1C. Then, the AC voltage is converted into a DC voltage by the rectification-and-smoothing section 1D, and the DC voltage is output to a specified load. In the configuration using an isolation transformer illustrated in FIG. 1, there are limitations on structural downsizing, as described above.

Figure 2:
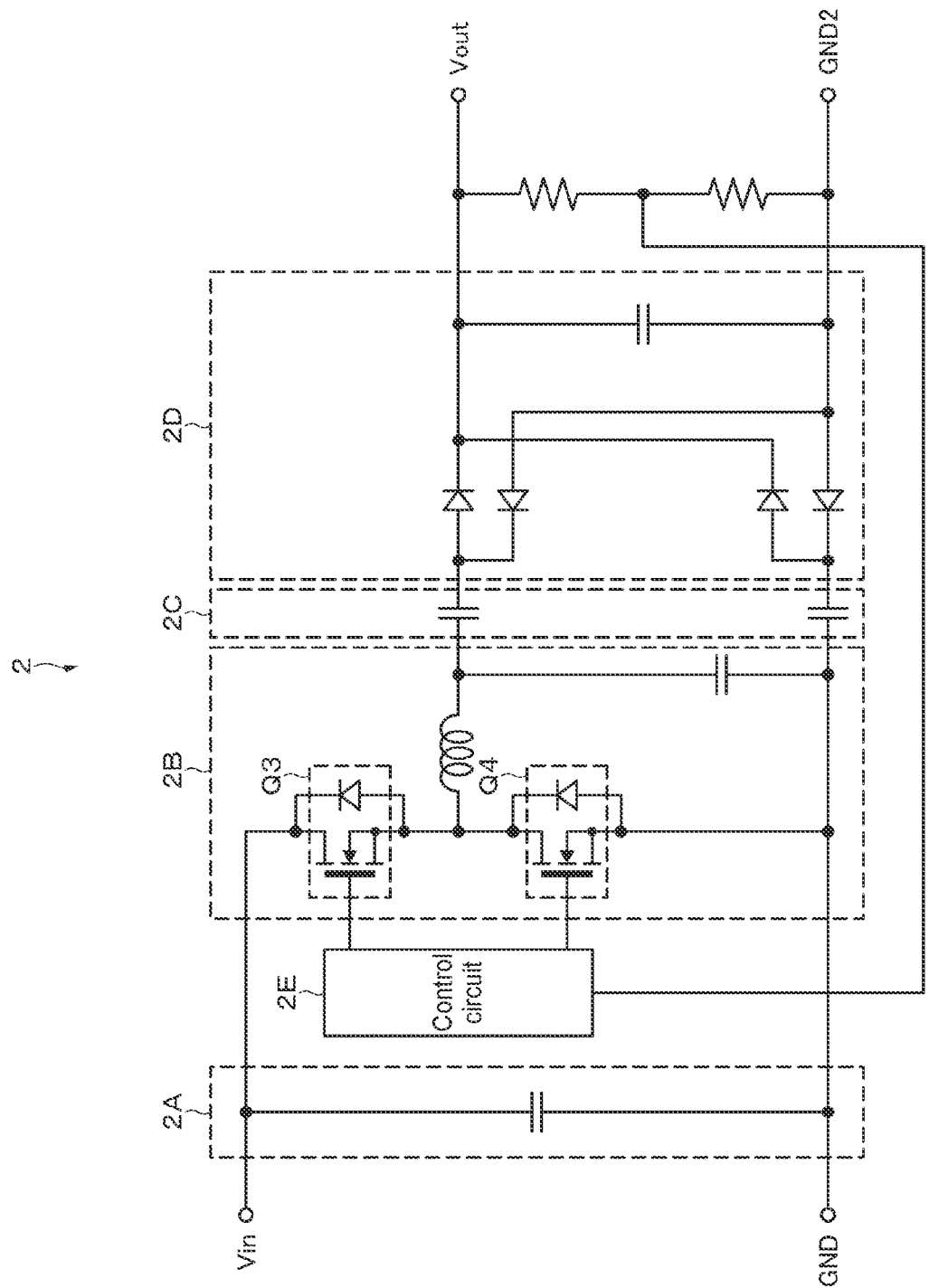
FIG. 2 illustrates an example of a circuit configuration of another general power circuit.

FIG. 2 illustrates an example of a circuit configuration of a power circuit that provides insulation and transfers power using a capacitor instead of an isolation transformer. A power circuit 2 illustrated in FIG. 2 includes an input section 2A, an AC voltage generator 2B, an isolation section 2C, a rectification-and-smoothing section 2D, and a control circuit 2E. An AC voltage generator 2B includes a switching element Q3 and a switching element Q4 that each include a MOSFET and are connected in series. Except that the isolation section 2C includes a capacitor instead of a transformer, the operation of the power circuit 2 is the same as the operation of the power circuit 1.

Figure 3:
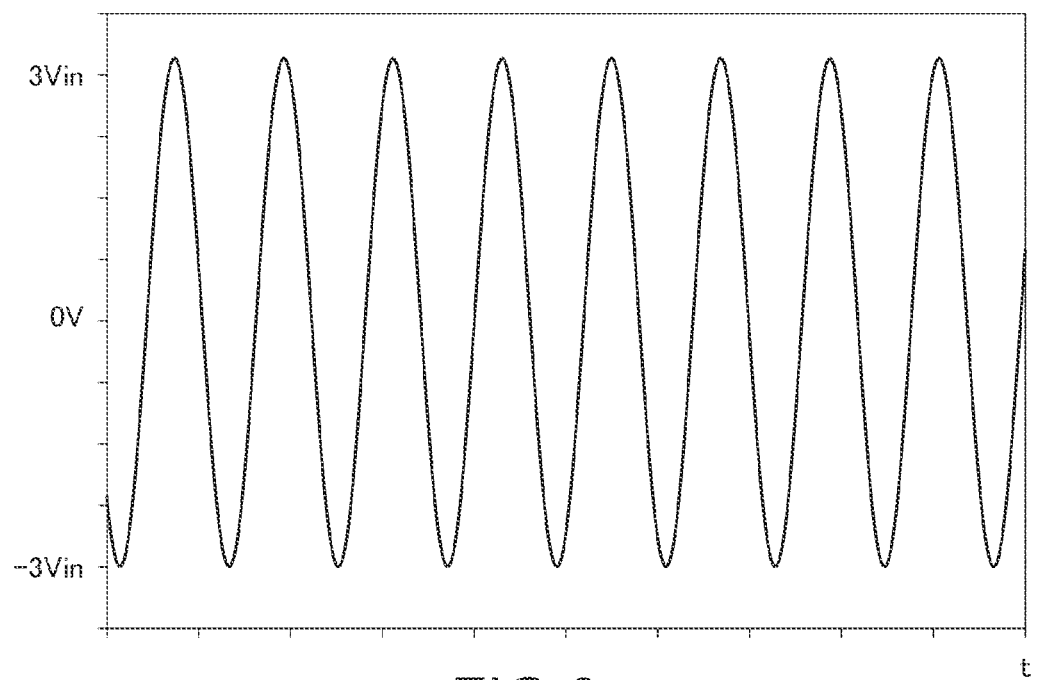
FIG. 3 illustrates an example of a waveform of a high-frequency voltage.

Direct current insulation can also be provided by the isolation section 2C including a capacitor instead of a transformer. However, the primary side and the secondary side are connected to each other using an impedance to form a circuit since the capacitor becomes the impedance at a high frequency, and an AC voltage (a changed voltage) synchronized with a high switching frequency (for example, several hundred kilohertz) is transferred through the insulation capacitor. Thus, isolation of a high-frequency voltage is not provided. The high-frequency voltage is also seen when a rectification-and-smoothing section is provided on the secondary side. For example, the high-frequency voltage is seen at an output-load end of the power circuit 2, as viewed from the primary side, that is, the high-frequency voltage is seen when the ground (GND) on the primary side (such as a neutral terminal) and an output end (Vout) are connected to each other through a resistance. FIG. 3 illustrates a waveform of a high-frequency voltage that is seen at the output-load end of the power circuit 2, as viewed from the primary side. Note that the waveform illustrated in FIG. 3 is a waveform obtained by a simulation result. Since the high-frequency voltage may have a bad effect on, for example, a circuit operation, it is desirable that the high-frequency voltage be reduced as much as possible.

The provision of a filter may also be adopted in order to reduce the above-described high-frequency voltage generated at a load end, as viewed from the primary side. However, there is a need for a specific condition used to set a value of a component (such as L and C) included in a filter, and this results in there being a need to design a filter depending on the condition each time. An embodiment of the present disclosure is described in more detail taking into consideration the points described above. Note that, unless otherwise specified, the high-frequency voltage is hereinafter referred to as a high-frequency voltage generated at a load end, as viewed from the primary side.

<Embodiments>

[Example of Configuration of Power Supply System]

Figure 4:
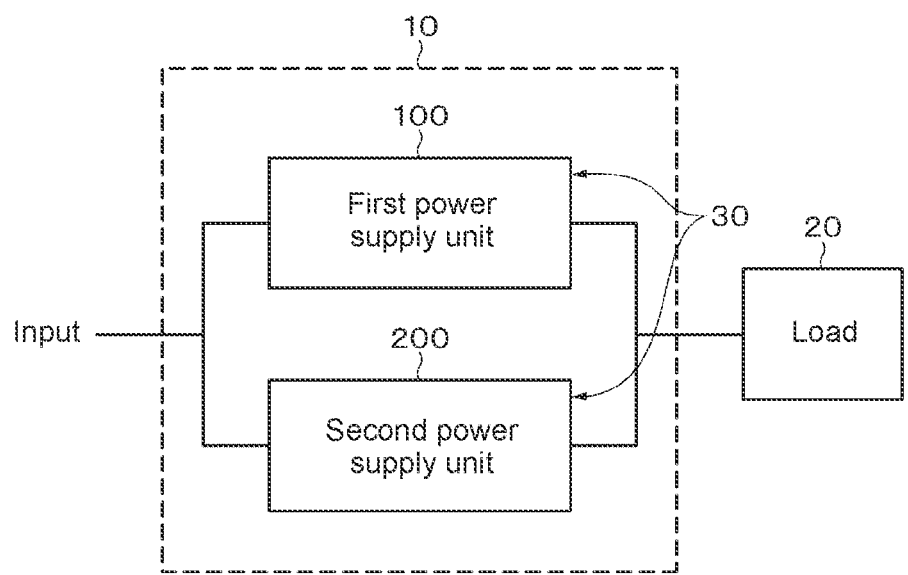
FIG. 4 illustrates an example of a configuration of a power supply system according to the present embodiment.

FIG. 4 illustrates an example of a configuration of a power supply system (a power supply system 5) according to the present embodiment. For example, the power supply system 5 includes a power circuit (a power circuit 10) according to the present embodiment, and a load 20 that is connected to the power circuit 10. The power circuit 10 includes at least a first power supply unit 100 and a second power supply unit 200. The paired first power supply unit 100 and second power supply unit 200 form a pair unit 30. The power circuit 10 may include a plurality of pair units 30.

Powers of the first power supply unit 100 and the second power supply unit 200 are combined by the first power supply unit 100 and the second power supply unit 200 being connected to each other. A power obtained by the combining, that is, a power (a DC voltage) from the power circuit 10 is supplied to the load 20. Note that an example of a method for connecting the first power supply unit 100 and the second power supply unit 200 will be described later.

Examples of the load 20 may include electronic apparatuses such as a television receiver and a printer, but the load 20 is not limited to a specific electronic apparatus. Further, the power supply 10 may be internally included in an adapter or a universal serial bus (USB) AC adapter.

[Example of Configuration of Power Circuit]

(Example of Configuration of First Power Supply Unit)

Next, an example of a configuration of the power circuit 10, that is, specifically, an example of a configuration of the first power supply unit 100 included in the power circuit 10 is described.

Figure 5:
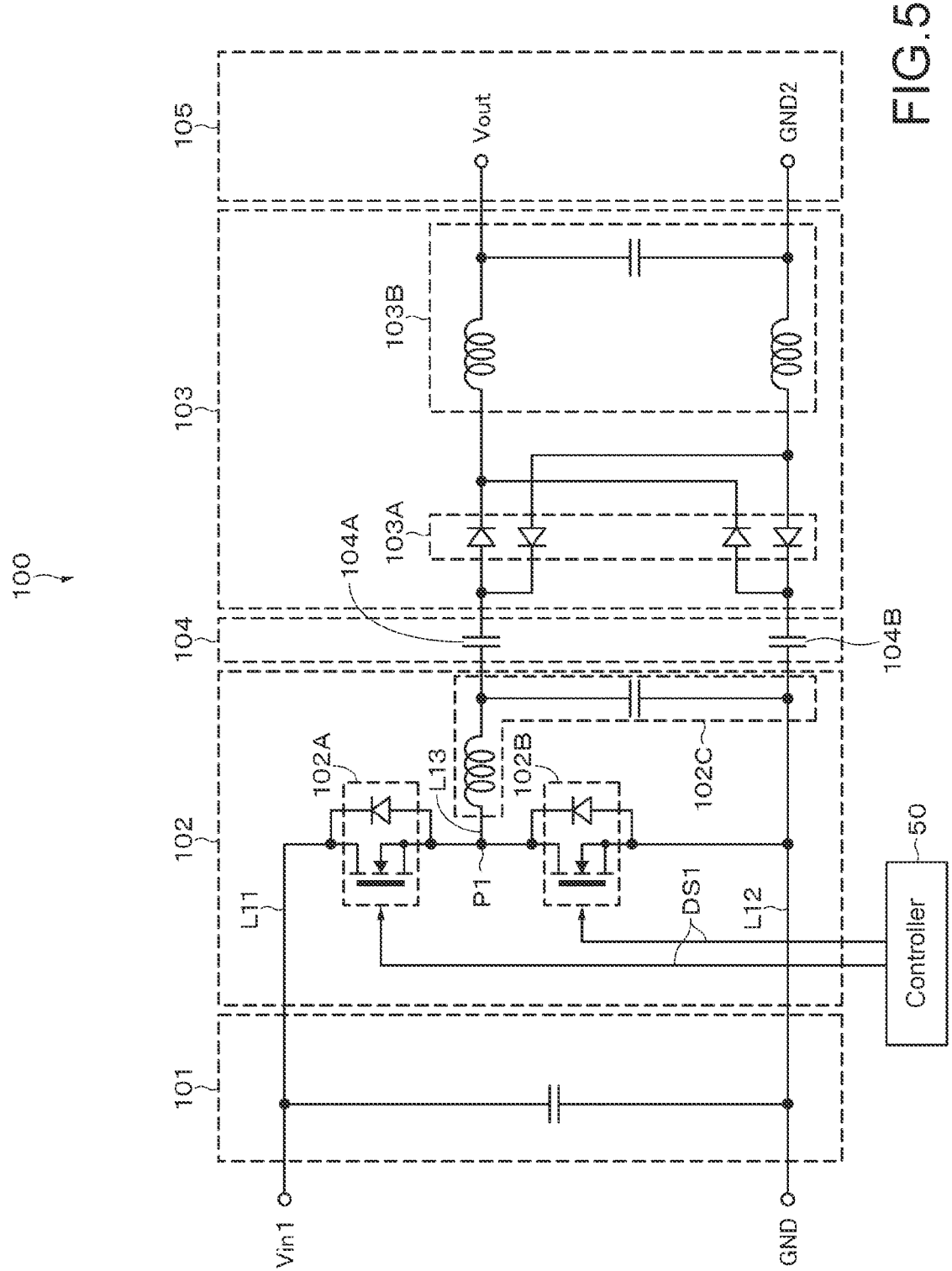
FIG. 5 illustrates an example of a configuration of a first power supply unit according to the present embodiment.

FIG. 5 is a circuit diagram illustrating an example of the configuration of the first power supply unit 100. For example, the first power supply unit 100 includes a first input section 101, a first AC voltage generator 102 that generates a first AC voltage on the basis of an input voltage input to the first input section 101, a first rectification-and-smoothing section 103 that rectifies and smooths the first AC voltage, a first isolation section 104 that includes a capacitor and is provided between the first AC voltage generator 102 and the first rectification-and-smoothing section 103, and a first output section 105 that outputs a DC voltage generated by the first rectification-and-smoothing section 103.

A DC voltage is input to the first input section 101 through a line L11 to which an input terminal Vin1 is connected, and a ground line L12. The DC voltage input to the first input section 101 may be a DC voltage obtained by rectifying and smoothing an AC voltage, or may be a DC voltage that passes through a power factor improving circuit.

Figure 6:
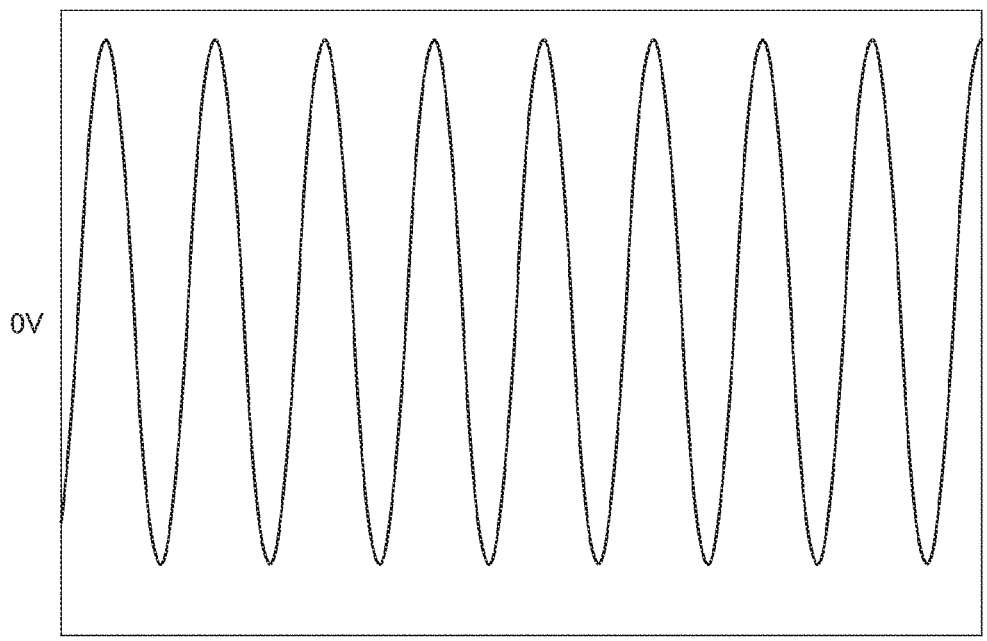
FIG. 6 illustrates an example of a waveform of an AC voltage generated by a first AC voltage generator according to the present embodiment.

The first AC voltage generator 102 generates an AC voltage on the basis of a DC voltage input through the first input section 101. The first AC voltage generator 102 according to the present embodiment includes a first high-side switch 102A and a first low-side switch 102B that are each connected between the line L11 and the ground line L12. The first high-side switch 102A and the first low-side switch 102B each include, for example, an n-type MOSFET. The first high-side switch 102A and the first low-side switch 102B are controlled by a first drive signal DS1 that is supplied by a controller 50, such that the first high-side switch 102A and the first low-side switch 102B are complementary to each other, that is, such that the first high-side switch 102A and the first low-side switch 102B are alternately turned on at a specified frequency in order to prevent an upper switching element and a lower switching element from being turned on at the same time. The waveform of an AC voltage generated by the first AC voltage generator 102 is a waveform of which an input voltage is symmetric in one cycle in amplitudes and periods of time in upper and lower portions obtained by dividing the waveform at a position corresponding to half the input voltage, as illustrated in FIG. 6.

An AC voltage generated by the first AC voltage generator 102 passes through a connection point P1 and an LC resonant circuit 102C to be taken out, the connection point P1 being situated between the first high-side switch 102A and the first low-side switch 102B. The AC voltage generated by the first AC voltage generator 102 passes through the first isolation section 104 to be supplied to the first rectification-and-smoothing section 103.

Note that the first AC voltage generator 102 includes the LC resonant circuit 102C including a coil and a capacitor, the coil being provided in a line L13 that is connected to the connection point P1, the capacitor being provided between the line L13 and the ground line L12. Switching losses are reduced by the LC resonant circuit 102C, and this results in zero voltage switching. However, the LC-resonant circuit 102C does not necessarily have to be used.

Note that, with respect to the configuration of the switching element of the first AC voltage generator 102, two pairs of switching elements respectively arranged on the upper side and on the lower side may be provided. In this case, an AC voltage generated by the first AC voltage generator 102 is output from a midpoint of the upper and lower switching elements of each pair.

The first rectification-and-smoothing section 103 includes a rectifier circuit 103A obtained by bridge-connecting four diodes, and a smoothing circuit 103B that includes two coils (a coil connected to the line L13 and a coil connected to the ground line L12), and a capacitor (a capacitor connected between the line L13 and the ground line L12). The AC voltage generated by the first AC voltage generator 102 is converted into a DC voltage by the first rectification-and-smoothing section 103, and the DC voltage is output through the first output section 105.

The first isolation section 104 includes a capacitor 104A connected to the line L13, and a capacitor 104B connected to the ground line L12. The first isolation section 104 isolates the primary side from the secondary side using the capacitor.

(Example of Configuration of Second Power Supply Unit)

Figure 7:
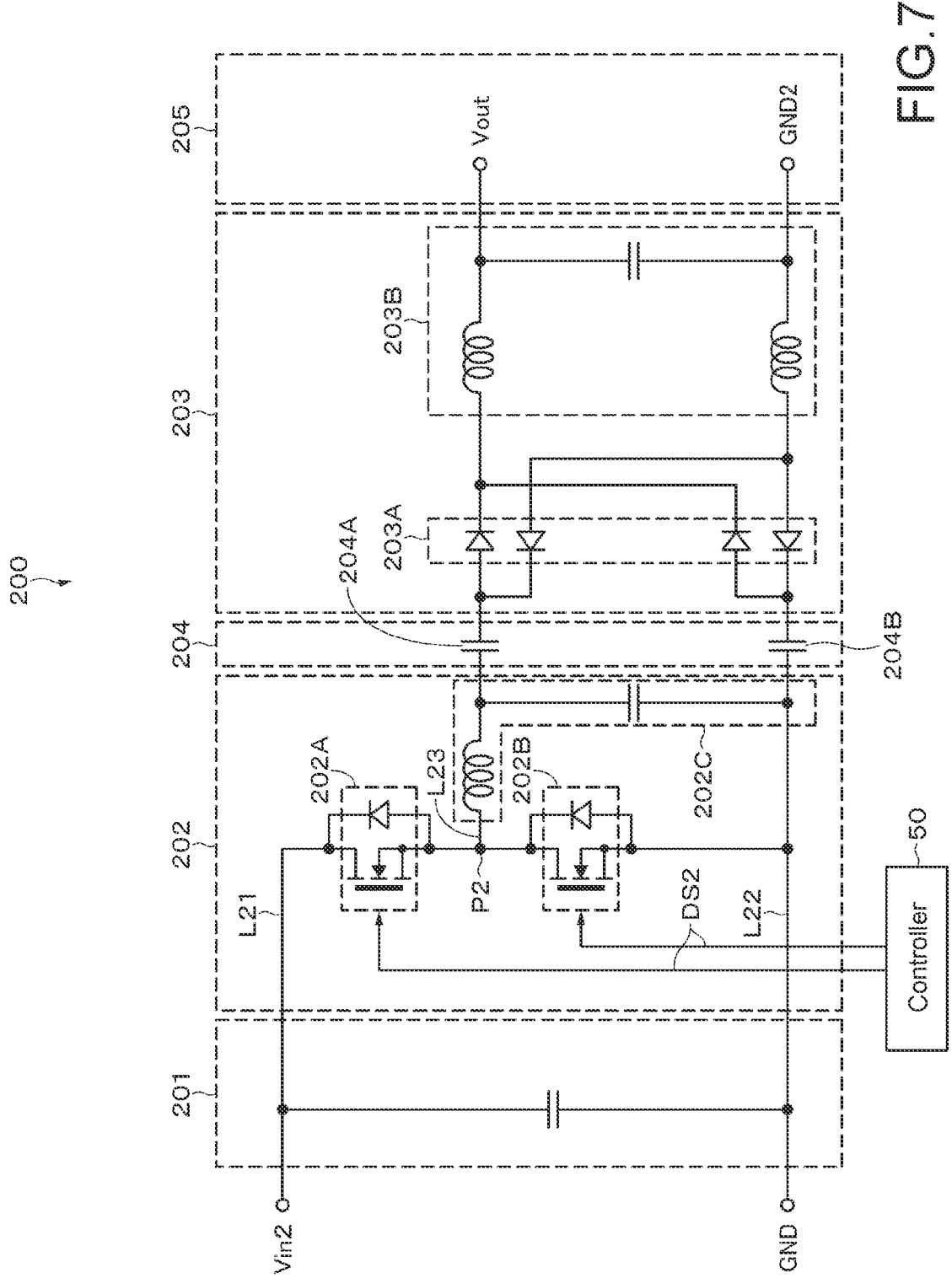
FIG. 7 is an example of a configuration of a second power supply unit according to the present embodiment.

FIG. 7 is a circuit diagram illustrating an example of a configuration of the second power supply unit 200. The second power supply unit 200 according to the present embodiment has the same configuration as the first power supply unit 100. Note that there may be a difference in configuration between the first power supply unit 100 and the second power supply unit 200.

For example, the second power supply unit 200 includes a second input section 201, a second AC voltage generator 202 that generates a second AC voltage on the basis of an input voltage input to the second input section 201, a second rectification-and-smoothing section 203 that rectifies and smooths the second AC voltage, a second isolation section 204 that includes a capacitor and is provided between the second AC voltage generator 202 and the second rectification-and-smoothing section 203, and a second output section 205 that outputs a DC voltage generated by the second rectification-and-smoothing section 203.

A DC voltage is input to the second input section 201 through a line L21 to which an input terminal Vin2 is connected, and a ground line L22. The DC voltage input to the second input section 201 may be a DC voltage obtained by rectifying and smoothing an AC voltage, or may be a DC voltage that passes through a power factor improving circuit.

The second AC voltage generator 202 generates an AC voltage on the basis of a DC voltage input through the second input section 201. The second AC voltage generator 202 according to the present embodiment includes a second high-side switch 202A and a second low-side switch 202B that are each connected between the line L21 and the ground line L22. The second high-side switch 202A and the second low-side switch 202B each include, for example, an n-type MOSFET. The second high-side switch 202A and the second low-side switch 202B are controlled by a second drive signal DS2 that is supplied by the controller 50, such that the second high-side switch 102A and the second low-side switch 102B are complementary to each other, that is, such that the second high-side switch 202A and the second low-side switch 202B are alternately turned on at a specified frequency in order to prevent an upper switching element and a lower switching element from being turned on at the same time.

An AC voltage generated by the second AC voltage generator 202 passes through a connection point P2 and an LC resonant circuit 202C to be taken out, the connection point P2 being situated between the second high-side switch 202A and the second low-side switch 202B. The AC voltage generated by the second AC voltage generator 202 passes through the second isolation section 204 to be supplied to the second rectification-and-smoothing section 203.

Note that the second AC voltage generator 202 includes the LC resonant circuit 202C including a coil and a capacitor, the coil being provided in a line L23 that is connected to the connection point P2, the capacitor being provided between the line L23 and the ground line L22. Switching losses are reduced by the LC resonant circuit 202C, and this results in zero voltage switching. However, the LC-resonant circuit 202C does not necessarily have to be used.

Note that, with respect to the configuration of a switching element of the second AC voltage generator 202, two pairs of switching elements respectively arranged on the upper side and on the lower side may be provided. In this case, an AC voltage generated by the second AC voltage generator 202 is output from a midpoint of the upper and lower switching elements of each pair.

The second rectification-and-smoothing section 203 includes a rectifier circuit 203A obtained by bridge-connecting four diodes, and a smoothing circuit 203B that includes two coils (a coil connected to the line L23 and a coil connected to the ground line L22), and a capacitor (a capacitor connected between the line L23 and the ground line L22). The AC voltage generated by the second AC voltage generator 202 is converted into a DC voltage by the second rectification-and-smoothing section 203, and the DC voltage is output through the second output section 205.

The second isolation section 204 includes a capacitor 204A connected to the line L23, and a capacitor 204B connected to the ground line L22. The second isolation section 204 isolates the primary side from the secondary side using the capacitor.

Note that the controller 50 detects an output voltage or an output current, and generates, using the detected voltage or current, the first and second drive signals DS1 and DS2 to output the generated drive signals, such that the output voltage or current is controlled to be a set output voltage or a set output current. The controller 50 may be provided for each power supply unit, or may be provided as a controller shared by the respective power supply units.

(Example of Operation of Power Circuit)

Subsequently, an example of an operation of the power circuit 10 is described. The power circuit 10 is configured such that the second AC voltage generator 202 generates an AC voltage of which a phase is obtained by inverting a phase of an AC voltage generated by the first AC voltage generator 102. In other words, in the power circuit 10, the switching elements included in each of the first and second AC voltage generators 101 and 102 are controlled to perform on-off switching, such that the second AC voltage generator 202 generates an AC voltage of which a phase is obtained by inverting a phase of an AC voltage generated by the first AC voltage generator 102.

Specifically, the first high-side switch 102A and the second high-side switch 202A are complementarily driven by the first drive signal DS1 and the second drive signal DS2 synchronized with the first drive signal DS1.

More specifically, the first high-side switch 102A is turned on and the first low-side switch 102B is turned off by the first drive signal DS1 in a specified switching period. Further, the second high-side switch 202A is turned off and the second low-side switch 202B is turned on by the second drive signal DS2 in the same switching period, the second drive signal DS2 being synchronized with the first drive signal DS1. The first high-side switch 102A is turned off and the first low-side switch 102B is turned on by the first drive signal DS1 in the next switching period. Further, the second high-side switch 202A is turned on and the second low-side switch 202B is turned off by the second drive signal DS2 in the same switching period (in the "next switching period" described above), the second drive signal DS2 being synchronized with the first drive signal DS1. Note that switching frequencies in one pair unit 30 are set to be the same frequency.

Figure 8:
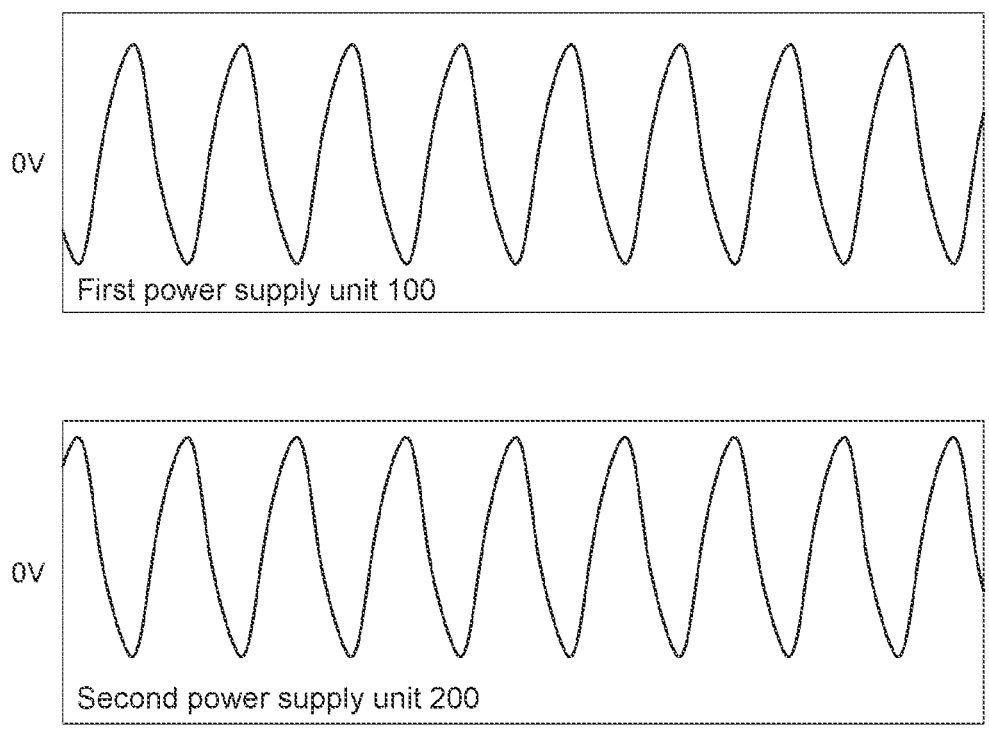
FIG. 8 contrastively illustrates a waveform of an AC voltage generated by the first AC voltage generator, and a waveform of an AC voltage generated by a second AC voltage generator.

The switching control results in obtaining an AC voltage waveform obtained by an operation performed by the first AC voltage generator 102, and an AC voltage waveform obtained by an operation performed by the second AC voltage generator 202, such that the AC voltage waveform obtained by the operation performed by the first AC voltage generator 102 exhibits a phase obtained by inverting a phase exhibited by the AC voltage waveform obtained by the operation performed by the second AC voltage generator 202, as illustrated in FIG. 8. Since an AC voltage generated by one of two power supply units exhibits a phase obtained by inverting a phase exhibited by an AC voltage generated by another of the two power supply units, a waveform of a high-frequency voltage generated by the one of the two power supply units also exhibits a phase obtained by inverting a phase exhibited by a waveform of a high-frequency voltage generated by the other of the two power supply units. Since the first power supply unit 100 and the second power supply unit 200 are connected to each other, one of the high-frequency voltages that exhibits a phase obtained by inverting a phase of another of the high-frequency voltages, and the other of the high-frequency voltages are canceled out by the one of the high-frequency voltages and the other of the high-frequency voltages being added. This results in being able to prevent, for example, a malfunction from being caused in the power circuit due to high-frequency voltage, without using, for example, a filter.

(Example of Method for Connecting Power Supply Units)

Subsequently, an example of a method for connecting the first power supply unit 100 and the second power supply unit 200 is described with reference to FIGS. 9 and 10. As described above, one pair unit 30 is formed by the first power supply unit 100 and the second power supply unit 200 being connected to each other.

A of FIG. 9 illustrates an example in which an input side of the first power supply unit 100 and an input side of the second power supply unit 200 are connected in series, and an output side of the first power supply unit 100 and an output side of the second power supply unit 200 are connected in parallel.

B of FIG. 9 illustrates an example in which the input side of the first power supply unit 100 and the input side of the second power supply unit 200 are connected in parallel, and the output side of the first power supply unit 100 and the output side of the second power supply unit 200 are connected in parallel.

A of FIG. 10 illustrates an example in which the input side of the first power supply unit 100 and the input side of the second power supply unit 200 are connected in series, and the output side of the first power supply unit 100 and the output side of the second power supply unit 200 are connected in series.

B of FIG. 10 illustrates an example in which the input side of the first power supply unit 100 and the input side of the second power supply unit 200 are connected in parallel, and the output side of the first power supply unit 100 and the output side of the second power supply unit 200 are connected in series.

For example, when the input sides are connected in series at an input voltage of 400 V, the series connection has the advantage of enabling a low-voltage switching element to be used, since 200 V is distributed to each power supply unit. Further, when the output sides are connected in series, this makes it possible to accumulate powers of one power supply unit that correspond to the number of power supply units connected in series. Furthermore, when the input sides and the output sides are respectively connected in parallel, the two power supply units can be connected to each other with no change since both input and output remain unchanged. However, which of the connection methods described above is to be adopted may be selected as appropriate according to, for example, a field in which the power circuit 10 is applied.

As described above, the present embodiment performs control such that a high-frequency voltage of which a phase obtained by inverting a phase of another high-frequency voltage, and the other high-frequency voltage are generated. Then, the high-frequency voltage of which the phase obtained by inverting the phase of the other high-frequency voltage, and the other high-frequency voltage are added. Accordingly, the high-frequency voltages are canceled out, and this results in being able to prevent, for example, a malfunction from being caused in a circuit due to high-frequency voltage.

<Modifications>

The embodiment of the present disclosure has been specifically described above. However, contents of the present disclosure are not limited to the embodiment described above, and various modifications based on technical ideas of the present disclosure may be made thereto.

The example in which the power circuit includes one pair unit 30 has been described in the embodiment above. However, the power circuit may include a plurality of pair units, as illustrated in FIG. 11. The number of pair units may be an odd number or an even number (although the number of power supply units is an even number). A method for connecting the respective pair units may be a series connection, a parallel connection, or a connection method in which a serial connection and a parallel connection are used in combination. FIG. 11 illustrates an example in which the input sides of the pair units are connected in series and the output sides of the pair units are connected in parallel. An input voltage is distributed to the respective pair units since the series connection is established on the input side. Thus, a low-voltage switching element can be used in each power supply unit.

With respect to a configuration in which a power circuit includes a plurality of pair units, a controller 50A that supplies drive signals to the power supply units in the plurality of pair units on a pair-unit-by-pair-unit basis may be provided, as illustrated in FIG. 12. The controller 50A may be included in the power circuit, or in an apparatus that is different from the power circuit. Further, with respect to the example of a configuration of the power circuit illustrated in FIG. 12, a power of the power circuit may be detected by the controller 50A, and a known feedback control may be performed by controller 50A according to the power of the power circuit.

In FIG. 12, for convenience of description, sequential numbers are assigned to the respective pair units, and sequential numbers are assigned to the power supply units in each of the pair units. Specifically, sequential numbers are assigned as indicated below: a pair unit 1, a pair unit 2, . . . , and a pair unit N; and a power supply unit 1, a power supply unit 2, . . . , a power supply unit (2N-1), and a power supply unit (2N).

A and B of FIG. 13 illustrate examples of drive signals supplied to the AC voltage generators in the respective power supply units. A of FIG. 13 illustrates an example of a drive signal supplied to the high-side switch of each of the odd-numbered power supply units 1, 3, . . . , and (2N-1), and an example of a drive signal supplied to the low-side switch of each of the odd-numbered power supply units 1, 3, . . . , and (2N-1). B of FIG. 13 illustrates an example of a drive signal supplied to the high-side switch of each of the even-numbered power supply units 2, 4, . . . , and (2N), and an example of a drive signal supplied to the low-side switch of each of the even-numbered power supply units 2, 4, . . . , and (2N).

Note that the timing of supplying a switching frequency or a drive signal may differ depending on the pair unit if control is performed in one pair unit such that a high-frequency voltage of which a phase obtained by inverting a phase of another high-frequency voltage, and the other high-frequency voltage are generated.

Further, the power circuit may include a block (a block 70) that includes the pair unit 30 and the controller 50, as illustrated in FIG. 14. Furthermore, the power circuit may include a plurality of blocks 70, as illustrated in FIG. 15. Synchronized controls are performed by the controllers 50 included in the respective blocks 70. Each controller 50 supplies the first and second drive signals DS1 and DS2 to the respective power supply units included in the same block. The input sections included in the plurality of blocks may be connected in series or in parallel, or may be connected by a series connection and a parallel connection being used in combination. Likewise, the output sections may be connected in series or in parallel, or may be connected by a series connection and a parallel connection being used in combination.

In the configuration illustrated in FIG. 15, the controller 50 of the block 70 may detect a power of the pair unit 30 included in the same block. Further, processing may be performed according to the power of each pair unit 30. For example, processing of achieving a balance between powers of the respective pair units 30 may be performed. For example, information that indicates a power of the pair unit 30 is communicated between the controllers 50 included in the respective blocks 70. When it has turned out, from a result of the communication, that the pair unit 30 included in the same block 70 as the controller 50 exhibits a power less than a power of another pair unit 30, a drive signal used to reduce the switching frequency is supplied by the controller 50 to perform control such that the power of the pair unit 30 is increased. On the other hand, when it has turned out, from the result of the communication, that the pair unit 30 included in the same block 70 as the controller 50 exhibits a power greater than a power of another pair unit 30, a drive signal used to increase the switching frequency is supplied by the controller 50 to perform control such that the power of the pair unit 30 is increased. Note that a known control to adjust the power balance described above may be performed without performing communication. Further, control to adjust a power may be performed using a known method other than the method for increasing and decreasing the frequency.

The circuit configuration of the power circuit may be modified without departing from the spirit of the present disclosure. For example, a full-bridge circuit configuration may be adopted. Further, another element such as an insulated gate bipolar transistor (IGBT) may be used as the switching element.

The configurations, the methods, the processes, the shapes, the materials, the numerical values, and the like in the embodiment described above are merely illustrative, and a configuration, a method, a process, a shape, a material, a numerical value, and the like that are different from those in the embodiment may be included as necessary. Further, the matters described in the embodiment and the modifications can be combined, unless there is a technical inconsistency. Furthermore, the present disclosure can also be provided in any form such as an application apparatus (such as a charger, a television receiver, a projector, a speaker, and an in-vehicle apparatus) using a power circuit. Moreover, the present disclosure may also be provided as a control method.

Note that the present disclosure may also take the following configurations.

(1) A power circuit, including: at least
a first power supply unit; and
a second power supply unit,
the first power supply unit including
a first input section,
a first AC voltage generator that generates a first AC voltage on the basis of an input voltage input to the first input section,
a first rectification-and-smoothing section that rectifies and smooths the first AC voltage, and
a first isolation section that includes a capacitor and is provided between the first AC voltage generator and the first rectification-and-smoothing section,
the second power supply unit including
a second input section,
a second AC voltage generator that generates a second AC voltage on the basis of an input voltage input to the second input section,
a second rectification-and-smoothing section that rectifies and smooths the second AC voltage, and
a second isolation section that includes a capacitor and is provided between the second AC voltage generator and the second rectification-and-smoothing section,
the power circuit being configured such that the second AC voltage generator generates the AC voltage of which a phase is obtained by inverting a phase of the AC voltage generated by the first AC voltage generator.

(2) The power circuit according to (1), in which
the first AC voltage generator includes
a first high-side switch, and
a first low-side switch that is turned on and off complementarily to the first high-side switch,
the second AC voltage generator includes
a second high-side switch, and
a second low-side switch that is turned on and off complementarily to the second high-side switch, and
the first high-side switch and the second high-side switch are complementarily driven by a first drive signal and a second drive signal that is synchronized with the first drive signal, the first drive signal being supplied to the first AC voltage generator, the second drive signal being supplied to the second AC voltage generator.

(3) The power circuit according to (2), further including a controller that outputs the first drive signal and the second drive signal.

(4) The power circuit according to (2), further including a plurality of pair units each being formed by the paired first power supply unit and second power supply unit.

(5) The power circuit according to (4), further including a controller that outputs the first drive signal and the second drive signal to the plurality of pair units on a pair-unit-by-pair-unit basis.

(6) The power circuit according to (4), in which
each of the plurality of pair units includes a controller that outputs the first drive signal and the second drive signal.

(7) The power circuit according to (6), in which
according to a power of each of the plurality of pair units, control is performed to switch a switching frequency on a pair-unit-by-pair-unit basis.

(8) The power circuit according to any one of (1) to (7), in which
the first input section and the second input section are connected in series or in parallel.

(9) The power circuit according to any one of (1) to (9), in which
the first power supply unit includes a first output section that is connected to the first rectification-and-smoothing section,
the second power supply unit includes a second output section that is connected to the second rectification-and-smoothing section, and
the first output section and the second output section are connected in series or in parallel.

(10) A control method that is performed by a power circuit that includes at least a first power supply unit and a second power supply unit, the first power supply unit including a first input section, a first AC voltage generator that generates a first AC voltage on the basis of an input voltage input to the first input section, a first rectification-and-smoothing section that rectifies and smooths the first AC voltage, and a first isolation section that includes a capacitor and is provided between the first AC voltage generator and the first rectification-and-smoothing section, the second power supply unit including a second input section, a second AC voltage generator that generates a second AC voltage on the basis of an input voltage input to the second input section, a second rectification-and-smoothing section that rectifies and smooths the second AC voltage, and a second isolation section that includes a capacitor and is provided between the second AC voltage generator and the second rectification-and-smoothing section, the control method including
performing, by a controller, control such that the second AC voltage generator generates the AC voltage of which a phase is obtained by inverting a phase of the AC voltage generated by the first AC voltage generator.

REFERENCE SIGNS LIST 10 power circuit
30 pair unit
50, 50A controller
100 first power supply unit
101 first input section
102 first AC voltage generator
102A first high-side switch
102B first low-side switch
103 first rectification-and-smoothing section
104 first isolation section
104A, 104B capacitor
105 first output section
200 second power supply unit
201 second input section
202 second AC voltage generator
202A second high-side switch
202B second low-side switch
203 second rectification-and-smoothing section
204 second isolation section
204A, 204B capacitor
205 second output section
DS1 first drive signal
DS2 second drive signal

What is claimed is:

1. A power circuit, comprising: at least
a first power supply unit; and
a second power supply unit,
the first power supply unit including
  a first input section,
  a first AC voltage generator that generates a first AC voltage on a basis of an input voltage input to the first input section,
  a first rectification-and-smoothing section that rectifies and smooths the first AC voltage, and
  a first isolation section that includes a capacitor and is provided between the first AC voltage generator and the first rectification-and-smoothing section,
the second power supply unit including
  a second input section,
  a second AC voltage generator that generates a second AC voltage on a basis of an input voltage input to the second input section,
  a second rectification-and-smoothing section that rectifies and smooths the second AC voltage, and
  a second isolation section that includes a capacitor and is provided between the second AC voltage generator and the second rectification-and-smoothing section,
the power circuit being configured such that the second AC voltage generator generates the AC voltage of which a phase is obtained by inverting a phase of the AC voltage generated by the first AC voltage generator.

2. The power circuit according to claim 1, wherein
the first AC voltage generator includes
  a first high-side switch, and
  a first low-side switch that is turned on and off complementarily to the first high-side switch,
the second AC voltage generator includes
  a second high-side switch, and
  a second low-side switch that is turned on and off complementarily to the second high-side switch, and
the first high-side switch and the second high-side switch are complementarily driven by a first drive signal and a second drive signal that is synchronized with the first drive signal, the first drive signal being supplied to the first AC voltage generator, the second drive signal being supplied to the second AC voltage generator.

3. The power circuit according to claim 2, further comprising a controller that outputs the first drive signal and the second drive signal.

4. The power circuit according to claim 2, further comprising
a plurality of pair units each being formed by the paired first power supply unit and second power supply unit.

5. The power circuit according to claim 4, further comprising
a controller that outputs the first drive signal and the second drive signal to the plurality of pair units on a pair-unit-by-pair-unit basis.

6. The power circuit according to claim 4, wherein
each of the plurality of pair units includes a controller that outputs the first drive signal and the second drive signal.

7. The power circuit according to claim 6, wherein
according to a power of each of the plurality of pair units, control is performed to switch a switching frequency on a pair-unit-by-pair-unit basis.

8. The power circuit according to claim 1, wherein
the first input section and the second input section are connected in series or in parallel.

9. The power circuit according to claim 1, wherein
the first power supply unit includes a first output section that is connected to the first rectification-and-smoothing section,
the second power supply unit includes a second output section that is connected to the second rectification-and-smoothing section, and
the first output section and the second output section are connected in series or in parallel.

10. A control method that is performed by a power circuit that includes at least a first power supply unit and a second power supply unit, the first power supply unit including a first input section, a first AC voltage generator that generates a first AC voltage on a basis of an input voltage input to the first input section, a first rectification-and-smoothing section that rectifies and smooths the first AC voltage, and a first isolation section that includes a capacitor and is provided between the first AC voltage generator and the first rectification-and-smoothing section, the second power supply unit including a second input section, a second AC voltage generator that generates a second AC voltage on a basis of an input voltage input to the second input section, a second rectification-and-smoothing section that rectifies and smooths the second AC voltage, and a second isolation section that includes a capacitor and is provided between the second AC voltage generator and the second rectification-and-smoothing section, the control method comprising
performing, by a controller, control such that the second AC voltage generator generates the AC voltage of which a phase is obtained by inverting a phase of the AC voltage generated by the first AC voltage generator.

* * * * *